Oct. 28, 1952     A. F. ECKEL     2,615,630
STRUCTURAL FORM OF SLIDE RULES

Filed Feb. 5, 1949     3 Sheets-Sheet 1

INVENTOR.
ARTHUR F. ECKEL
BY Robert P. White
ATTORNEY

Oct. 28, 1952　　　　　A. F. ECKEL　　　　　2,615,630
STRUCTURAL FORM OF SLIDE RULES
Filed Feb. 5, 1949　　　　　　　　　　　　3 Sheets-Sheet 2

INVENTOR.
ARTHUR F. ECKEL
BY Robert P White
ATTORNEY

Oct. 28, 1952     A. F. ECKEL     2,615,630
STRUCTURAL FORM OF SLIDE RULES
Filed Feb. 5, 1949     3 Sheets-Sheet 3

INVENTOR.
ARTHUR F. ECKEL
BY
Robert P. White
ATTORNEY

Patented Oct. 28, 1952

2,615,630

UNITED STATES PATENT OFFICE 2,615,630

STRUCTURAL FORM OF SLIDE RULES

Arthur Frederick Eckel, Inglewood, Calif.

Application February 5, 1949, Serial No. 74,738

18 Claims. (Cl. 235—71)

This invention relates to slide rules, and has particularly to do with means for housing coilable scale members in the cursor thereof.

Conventional slide rules comprised of rigid and stiff structural materials are awkward to carry in the pocket. The present invention discloses a slide rule structure which can easily be carried in the pocket, yet with scales ten, twenty, or even thirty inches in length or more.

An object of my invention is to provide a slide rule in which the slide members are flexible and retainable by coiling in a separate retainer for compactness in carrying.

Another object is to provide a slide rule in which the slide members are retainable in the cursor.

Another object is in the use of single steel tape housing retainer to serve both as retainer and cursor.

Another object is the employment of two housing retainers fastened side by side in which the scales are adjustable opposite one another the combination of locked retainers serving as a single cursor.

Another object is in the provision of means for interchanging flexible scales.

Still another object is to provide a combination cursor and retainer the scale members being graduated logarithmically for calculating and one scale graduated in centimeters, the other in inches. Both scale members are extendable to serve as scaled rules for drawing.

Still another object is in the provision of locking means whereby each scale member can be locked separately to the cursor and additional locking means provided to lock one scale to the other to facilitate calculations.

Still another object is to provide a slide rule in which the scale members are coilable in the cursor and the operation of cursor and scale members simulate a rigid straight slide rule.

Still another object is in the provision of means for locking more than two scales and cursor members together to facilitate calculations in special types of calculations.

Still another object is to provide a cursor in which the scale members are lockable separately to the cursor.

With these and other objects in view, my invention consists in the construction, arrangement and combination of the various parts of my device whereby the objects contemplated are attained as hereinafter more fully set forth, pointed out in my claims and illustrated in the accompanying drawings, wherein:

Heretofore slide rule members have been constructed of stiff rigid material of considerable thickness, as for instance in the older types of straight slide rules as well as circular slide rules. Recent attempts have been made to shorten the conventional 10 inch length scales on the straight slide rules to 5 inches, resulting in a slide rule of approximately 6 inches overall for compactness in carrying. The fore-shortening has been at the sacrifice of accuracy the slide rule remaining awkward in size for carrying in the pocket. My invention employs scale members which can be coiled into a small space after use and which is stiffly extendable when uncoiled simulating scale members of considerably more thickness and weight, yet rigid enough to perform the usual operations necessary for calculation employed in the conventional slide rule.

The property of thin steel tape bellied transverse to its length, or longer dimension to remain rigid and extendable without bending is well known. Thin plastic tape bellied as aforementioned or a combination of thin steel and thin bonded plastic thereto also possesses the property of rigidity in length when extended. Previously, then, tape carrying a slight curve or V has been used in steel and plastic measuring tapes carrying linearly divided scales. The present invention makes use of thin curved tape stock carrying logarithmically divided scales, one scale member adjustable opposite another, or one scale over another, to form a slide rule. A slide rule constructed of coilable scale members is exceedingly compact for carrying and it is exceedingly practicable to have scale members 10, 20, 30 or 40 or more inches long which can be housed by coiling into a very small space for carrying in the pocket. My invention refers to the structure and variations to produce a slide rule in which the scale members are directly coilable into the housing or retainer where the housing also serves as a cursor.

Figures 1, 2:
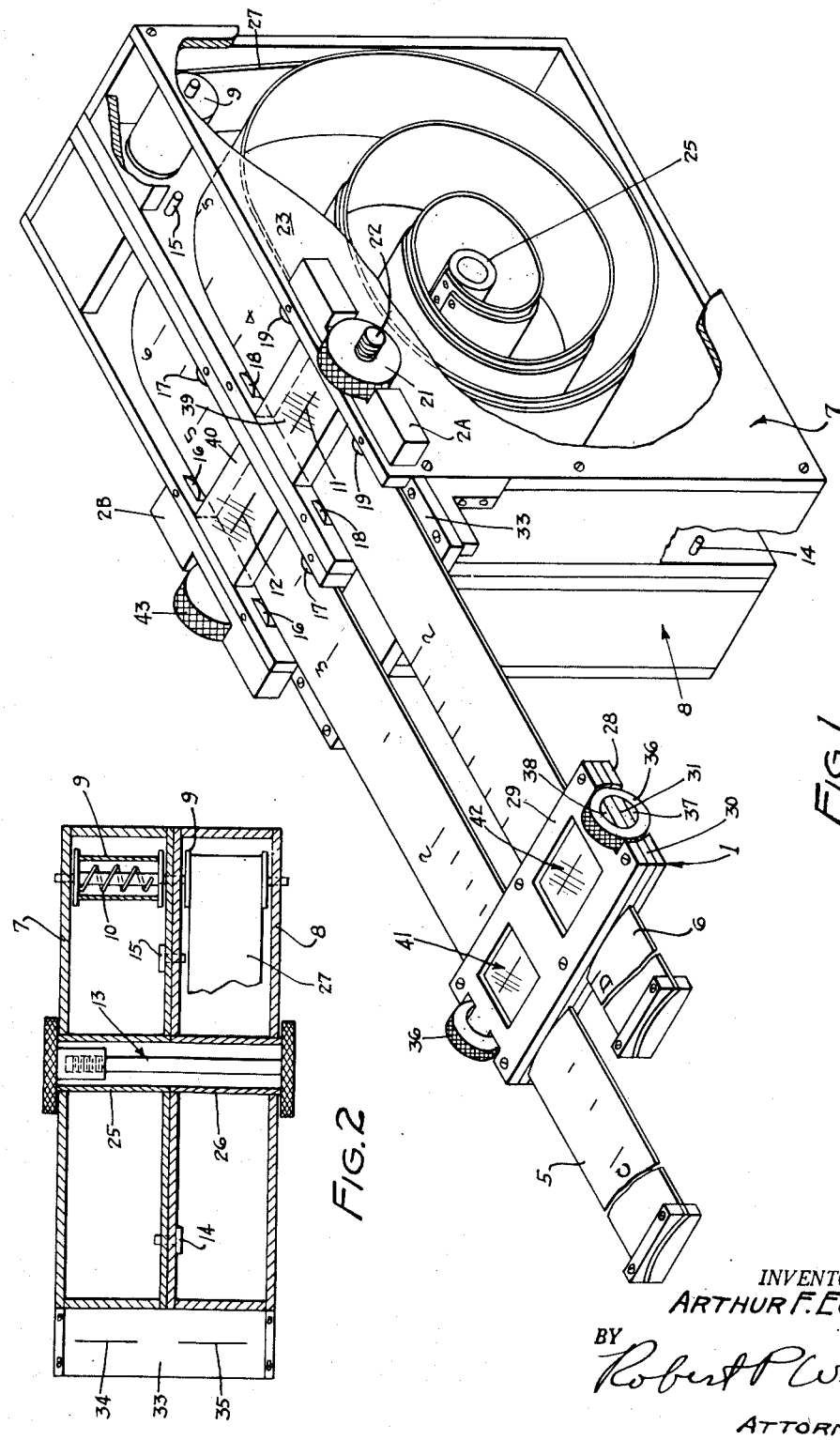
Figure 1 illustrates a complete slide rule incorporating the main features of the present invention.
Figure 2 is a bottom view of Figure 1 looking upwardly and illustrates the means of securing the housing-cursors one to the other.

Referring now in detail to the drawings, one form of the slide rule made according to my invention is illustrated in Figure 1, wherein coilable slide scale members 5 and 6 carrying logarithmic scales for calculating are coilable and retainable in the housings 7 and 8. The novelty in the invention is in the use of the coilable scale members, curved or conforming to the V transverse to the length which after uncoiling extend stiff and straight simulating a rigid slide rule. The additional novelty in the invention is the use of the scale retainer housings 7 and 8 to perform the function of a conventional slide rule cursor.

In the construction of more expensive modifications for ease of operation of my slide rule and in accordance with this form of my invention a roller 9 is provided which carries a cloth tape or the like and which is recoilable back on to the roller spool by the winding and unwinding by spring action means 10, Figure 2. This tape prevents the surfaces carrying scales on either side from coming into direct contact with the adjacent surface of the coilable scale members, thus protecting the scale surfaces from scratching from coiling and uncoiling.

Figure 3:
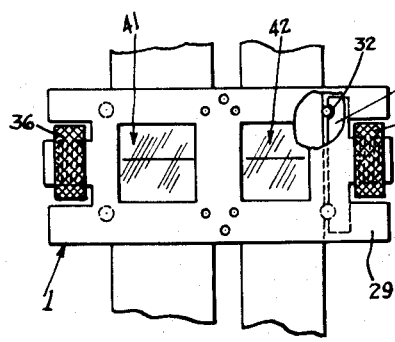
Figure 3 is a detail view of the locking means (1) in Figure 1.
Figures 4, 5:
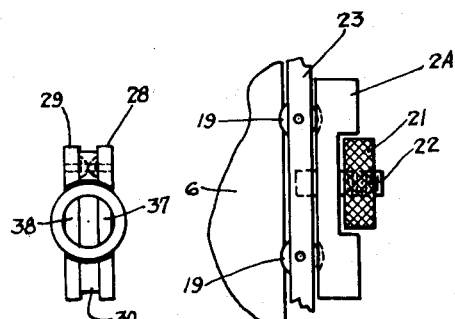
Figure 4 is a right end view of the locking means of Figure 3.
Figure 5 is a detail view of the locking means 2 in Figure 1.
Figure 9:
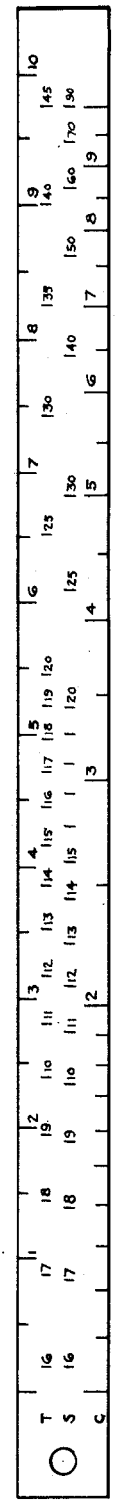
Figures 9 and 10 illustrate the logarithmic scales on the flexible slide rule members and the centimeter ruling scale on one and inch ruling scale on the other for ruling and measuring.
Figure 10:
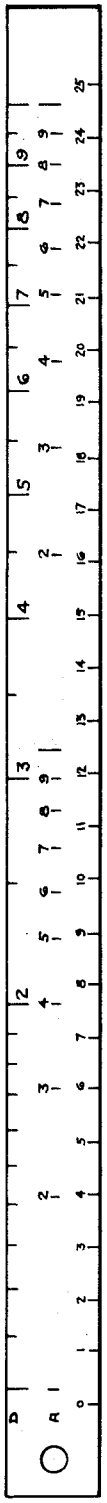

Locking means 2A and 2B lock scales 6 and 5 respectively in a definite position with reference to hairlines, 11 and 12 and locking means 1 locks scale members 5 and 6 one to the other. Although only the conventional C and D scale are shown on the scale members 5 and 6, other scales as for instance, trigonometric, square root and the like as shown in part in Figures 9 and 10, or log log, or any other logarithmic scales can be constructed on said scale members for calculating. In the construction illustrated each scale member is houseable in a separate housing cursor. By removing locking means 1 and screw-nut-securing means 13, housing 7 can be separated from 8 and another housing member attached to one or the other whose scale member carries other scales for other calculations. Pins 14 and 15 are for locating the housing accurately for interchanging. Scale members 5 and 6 pass through rollers 16 and 17, 18 and 19 for ease of motion in operating and for locking the scale members. Figures 1 and 5 show the brake shoes 2A frictionally engageable with pulley wheel 19 by screwing nut 21 on screw 22, said screw 22 being secured in the housing wall 23. To lock, pulley wheels 19 or 16 are lockable by the action of shoes 2A and 2B respectively thus frictionally preventing either scale member 5 or 6 or both from motion inward or outward with respect to the housing 7 and 8. The end of scale member 6 is fixedly secured to the cylindrical hollow cylinder 25 extending inside the housing and said scale member 6 is coilable about 25. The spring winding action facilitates motion in either direction of the scale members 6 and 5. Scale member 5 is coilable about a similar hollow tube 26 Figure 2. To protect the scale member surfaces from abrasion, scratching and undue wear a cylinder 9 carrying a windable spring 10 (shown with just a few turns for clarity), carries a tape 27 which covers and uncovers the spiral scale members inside the housing. The scale locking means 1, which locks the scale 5 to 6 or 6 to 5, is similar in operation to locking means shown in Figure 5. Two flat members 28 and 29 straddle both scale members as shown in Figures 3 and 4, and are composed entirely of plastic or metal with plastic windows. Separators like 30 position said members far enough apart to accommodate thin shoes like 31, which frictionally can engage pulley wheels like 32 and prevent the rotation thereof and in turn prevent the motion of scale members therethrough. Pulley wheels like 32 can have a slightly oversized bearing hole and thus be slightly translatable against the edge of the scale member thus ensuring rigid locking. It is obvious, but not shown, that scale members 5 and 6 can carry scales on the reverse side and calculations can be performed thereon. Likewise the scales on the one side can refer to the scales on the opposite side and thus calculations can originate on one side and end on the side opposite. For calculations involving both sides of the scale members another cursor mounting 33 is provided carrying hairlines 34 and 35, Figure 2. In the locking means 1, Figure 1, nut 36 screws on to the threaded portions like 37 and 38 of the upper and lower members of flat plates 28 and 29. Cursor windows 39 and 40 fixed to the cursor housings carrying hairlines 11 and 12 serve as means for calculating on the upper sides of the scale members 5 and 6. For certain calculations it is sometimes advantageous to provide hairlines and windows as shown at 41 and 42 on locking means 1, Figure 1.

*Operation of slide rule for multiplication*

Figures 6, 11:
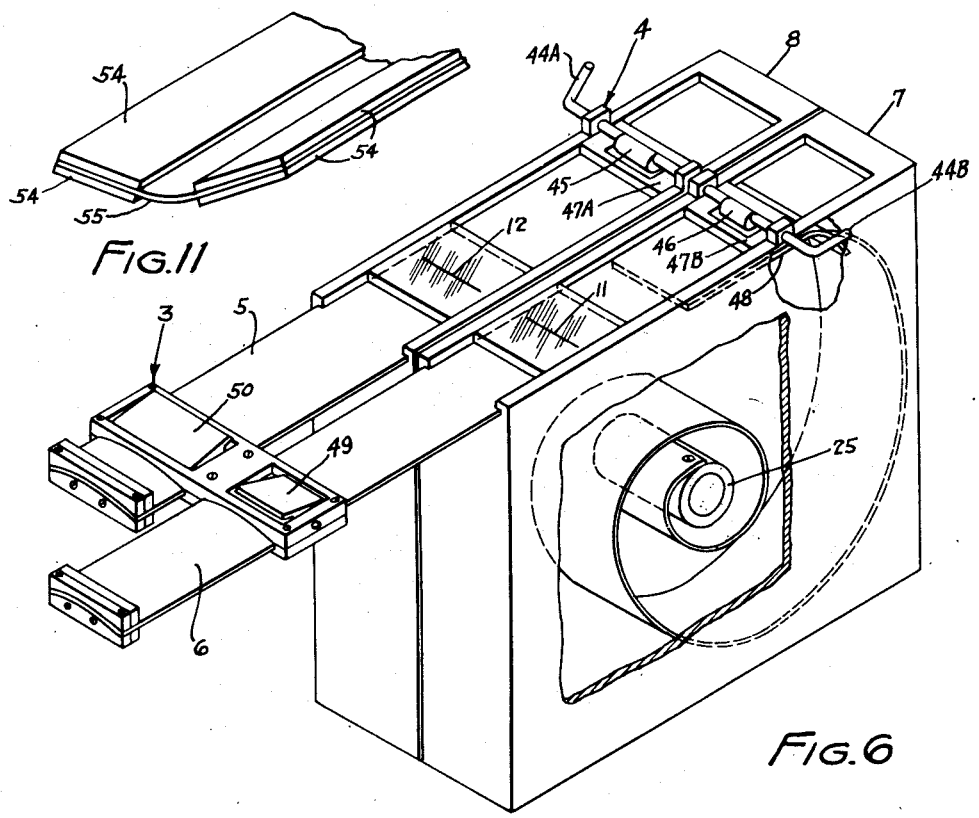
Figure 6 illustrates an alternative means of locking the flexible slide portions of the rule employing cam locking means.
Figure 11 illustrates a portion of a flexible slide rule member in which thin plastic faces are bonded, as shown, to the flexible slide rule member with a groove extending the length thereof through the middle of the member to permit transverse flexing of said member.

An example of multiplication employing the form of my invention as illustrated in Figures 1 and 6 are as follows:

Assume that we are to multiply 2 times 3. Position the 2 on the D scale of member 6 under the hairline 11 of cursor member 39, previously having released locking screws 37 and 38 of locking means 1, Figure 1. Lock scale 6 to cursor by turning locking nut 21. Position the left index 1 of the C scale of scale member 5 under hairline 12 of cursor member 40. Hairlines 11 and 12 having previously been adjusted to fall in the same straight line. Lock scale 5 by means of locking nut 43. The left index of the C scale is now over 2 of the D scale. Lock both scales together by turning locking screw 36. Unlock scale members 5 and 6 now by turning locking screws 21 and 41. Pull scale members 5 and 6 now by turning locking screws 21 and 43. Pull scale members 5 and 6 outward from the cursor now until the 3 of scale C of member 5 is under hairline 12. The operator can now optionally lock scale members to housings 7 and 8. The result 6 is read under hairline 11 on scale D. If a sequence of factors are to be multiplied, the left index of C on scale member 5 can again be brought under hairline 12 and by unlocking and subsequently relocking locking means 1 and turning nuts 41 and 21. As for instance, the result 6 was under the hairline 11 on scale D, suppose that it was desired to multiply by an additional factor of 1.5. The left index of scale C having been positioned under hairline 12, both locking screws 36 are turned to lock the scales 5 and 6 together. Screws 21 and 43 are turned to release. Locked scales C and D are then pulled out from the cursor until 1.5 on the C scale is again under hairline 12. Below scale C on scale D and under hairline 11, the result 9 is read. Thus a sequence of multiplications can be carried on as with the conventional slide rule. Suppose, however, that instead of the third factor being 1.5, in which the answer does not go off scale that the factor had been 5. Effectively, then, the product of 6 times 5 was to be obtained. It is obvious that the result, or answer would go off scale at the right. The procedure in this case when the answer goes off scale to the right in multiplication is as follows: The number 6 on the D scale is now under the hairline 11. Instead of placing the left index of the C scale under the hairline 12, the right index is placed thereunder. The scales C and D are locked together with locking means 1 and both locked members pushed into the cursor housing (after screws 21 and 43 are released) until the 5 of the C scale is under hairline 12. Directly below, under the hairline 11 on scale D the result 30 is readable.

*Operation of slide rule for division*

Assume that it is required to divide 6 by 3. Method (1)—Adjust the 6 of scale D under the hairline 11 and lock. Locking means 1 is unlocked. Adjust 3 on scale C under hairline 12 and lock. Position hairline 41 of locking member 1 over left index of C scale and directly under hairline 42 on scale D the result 2 is readable. Method (2)—However, the result can be read in an alternative manner as for instance: the 6th division of scale D having been brought under the hairline 11 and the scale member locked and 3 of scale C having been brought under the hairline 12 and the scale member locked, both scale members are locked together by means of locking means 1, screws 21 and 43 then released and both scales pushed into the cursor housing until the left index of C is under hairline 12. Directly below on scale D under hairline 11, the result 2 is readable. To an operator skilled in the use and operation of the conventional slide rule the operation of the rule in this present invention is straightforward, and simulates the operation of the conventional form. If in division lines the result goes off scale to the left, as for instance in the division of 4 by 5, the 4 on the D scale is placed under the hairline 11 and the 5 of the C scale placed under the hairline 12. Both scales are locked together by means of 1 and pulled out until the right index of scale C in under the hairline 12, directly below on scale D the result .8 is read under the hairline 11. It is obvious then that a sequence of multiplications or divisions can be performed in the same manner as with the conventional slide rule, the operator merely remembering for convenience that he is adding and subtracting lengths from a reference scale, usually the D scale.

The employment of coilable scale members as described and illustrated herein permits calculations to be performed on logarithmic scales of considerable length, rendering greater accuracy as well as permitting, when desired, greater spacing between division lines for ease in reading. It is remarkable in the use of this slide rule the speed and facility that can be acquired in its operation. The fact that the scales can coil back into the housing and out of the way so far as the right hand (usually) has exceeding advantage. Depending on the width of each scale member a considerable number of scales can be located on either the front or back. The back scales can be read by means of the hairlines on the back of the auxiliary cursor combined with the locking means 1, or on the hairlines of the cursor member 33.

The scale members can carry log log scales or square and cube root scales or, the conventional A scale can be carried on one scale and the B scale on the other, or trigonometric scales can be likewise located on either scale or both. Other logarithmic scales not of the conventional type can also be located on the members. Should the number of scales exceed the practical width of either or both scale members, provision is made, by means of securing means 13 and pins 14 and 15 for interchanging. As for instance the conventional D scale can be retained on one unit to be combined with another scale carried in another interchangeable housing unit specifically suitable for chemical calculations. It is likewise obvious that more than two, three or more for instance, scale members and their respective housings secured together for calculations in which such an arrangement would be advantageous. Slide rules referred to in the art as custom-built, often employ more than two slidable or movable scale members.

The foregoing description refers particularly to Figure 1. However, the operation of the slide rule shown in Figure 6 is identical. Figure 5 shows different locking means, both for the locking means 3 which lock the scale members one to the other and for the locking means 4 which lock the scale members 5 and 6 to their separate housings. Figure 6 shows cam locking means, whereas Figure 1 shows screw locking means.

Figure 8:
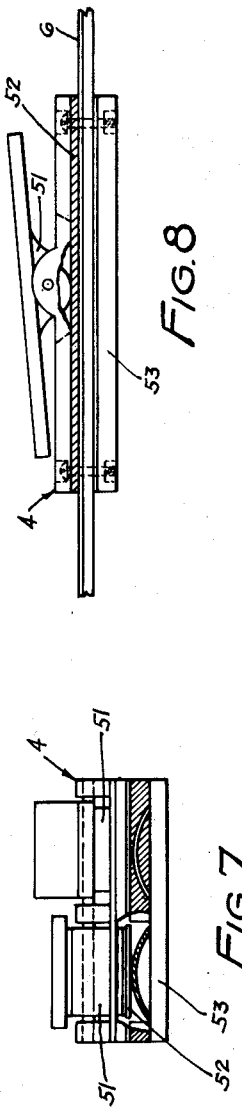
Figure 8 is a side detail view, partially in section of the locking means of Figure 7.
Figure 7:
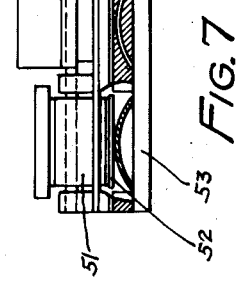
Figure 7 is a vertical sectional view of the locking means 3 in Figure 6.

The operation of the locking means illustrated in Figures 6, 7, and 8 is as follows: Shafts 44A and 44B carry eccentric cams 45 and 46 which press against countersunk areas in plates 47A and 47B. Scale member 6, for instance, is slidable between plate 47B and fixed plate 48. Rotation of shaft 44B in the proper direction causes movable plate 47B to approach fixed plate 48, thus holding scale member 6 securely between. The locking means 3 which locks one scale to the other illustrates the same cam action as described above but with flat pressable plates 49 and 50 carrying cam members 51. The cam member 51 engages the reed plate 52 causing it to press against the scale member as for instance 6 and pressing it against bottom plate 53 of locking means 3. Thus the scale member is frictionally held between members 52 and 53.

In constructions conforming to this invention where it is advantageous to increase the thickness of the scale member by bonding an appreciable thickness of plastic to a coilable metal member or a thinner coilable plastic or equivalent member, the construction illustrated in Figure 11 can be employed. A bellied or V coilable member has the faces like 54 bonded thereto. A narrow groove extending to the mounting surface 55 or approximately thereto and extending down the middle the entire length of the scale member is provided for ease in transverse flexing. The overall thickness of the complete structure however should not exceed a value which would prevent coiling along the length of the complete structure. The bonded faces comprised of thin plastic in practice, however, are from 10 to 20 thousandths in. thickness and thus remain conveniently pliable for easy coiling.

While I have herein shown and described a preferred embodiment of my invention, manifestly it is susceptible of modifications and rearrangement of the parts without departing from the spirit and scope thereof. I do not, therefore, wish to be understood as limiting my invention to the precise form herein disclosed, except as I may be so limited by the appended claims.

I claim as my invention:

1. A slide rule comprised of a plurality of transversely bowed coilable scale members, a cursor in which said scale members are housable when not in use; and means provided for locking each scale member in position in the cursor during calculating operations.

2. A slide rule combination of a plurality of transversely bowed coilable scale members and a cursor; said scale members retractable into the cursor, and means provided for locking each scale member in position in the cursor during calculating operations.

3. A slide rule comprised of a plurality of transversely bowed coilable scale members and a cursor; said scale member houseable in the cursor, said scale members positionable and lockable in the cursor for making calculations.

4. A slide rule comprised of transversely bowed coilable scale members a combination cursor-housing for housing said coilable scale members; means provided for locking each scale member in position in the cursor during calculations, and a separate cursor slidable on said scale members.

5. A slide rule comprised of transversely bowed adjacent coilable scale members a combination cursor-holder for said scale members; means provided for locking each scale member in position in the cursor during calculations, and means provided for locking each scale member to the other, said means also serving as a second cursor.

6. In a slide rule comprised of coilable scale members and combination cursor-holder for said scale members means to lock each scale member to the cursor housing and means to lock said scale members to one another.

7. A slide rule comprised of transversely bowed coilable scale members and a cursor, a housing for coiling said scale members therein, said housing comprising a section of a cylinder closed at one end by a cursor.

8. In a slide rule comprised of transversely bowed coilable scale members, a cursor for housing said coilable scale members, said cursor provided with means for releasing lockable coilable scale members for positioning the hairlines in a calculation.

9. A slide rule comprised of a multiplicity of cursor-housing units fastenable side by side having a coilable scale member positioned therein, each said cursor-housing unit comprised of a hairline member, means for locking said scale members to the housing structure of each said unit means for fastening the units to one another in multiplicity means provided for locking any scale member to any other scale member means provided to lock any multiplicity of locked scales to any other multiplicity of locked scales for facilitating slide rule calculations.

10. A slide rule comprised of coilable scale members and a cursor, said scale members housable in the cursor when not being used for calculating means provided to position said scales side by side in the cursor for calculating; means for releasing each coilable scale member for separate movement, and means for maintaining said other coilable scale member in locked position while said coilable member is so released.

11. In a slide rule comprised of coilable scale members and a cursor, said scale members housable in a combination cursor housing said scale members positionable one over the other in the combination cursor housing for calculating; and a separator provided in the cursor to prevent the movement of one scale member when the other scale member is moved over the other.

12. A slide rule comprising in combination a plurality of flexible scale members, a cursor positioned for travel thereon, a housing adapted for coiling said scale members therein, and means for individually locking each scale member in position in said housing.

13. A slide rule comprising in combination a plurality of flexible scale members, a cursor positioned for travel thereon, a housing adapted for coiling said scale members therein, and means for individually locking each scale member in position in relation to said cursor.

14. A slide rule comprising in combination a plurality of flexible scale members, a cursor positioned thereon, a housing adapted for coiling said scale members therein, means for individually locking each scale member in position in said housing and means for individually locking each scale member in position in said cursor.

15. A slide rule comprising in combination a plurality of flexible scale members, a cursor positioned for travel on said scale members, a housing for coiling said flexible scale members therein, said flexible scale members each being attached at one end to retaining means in said housing, means in said housing for separating successive layers of said flexible scale members as they are coiled within said housing, and means for individually locking said scale members in said housing.

16. A slide rule comprising in combination a plurality of flexible scale members, a combination cursor housing adapted for coiling said scale members therein when said scale members are not being used for calculations, means for anchoring one end of said scale members within said cursor housing, a second cursor positioned for travel on said scale members, and means for locking each of said scale members to the other.

17. The apparatus of claim 16 further characterized in that a separate housing is provided for each individual scale member, means for connecting a plurality of said individual housings together whereby said housings may be retained in juxtaposition or disassociated from said juxtaposition as desired.

18. A slide rule comprising in combination a pair of flexible scale members, a combination cursor housing, means whereby said flexible scale members may be coiled in said cursor housing when not used for calculations, means for positioning said flexible members in position in said cursor housing for calculations, and individual locking means for retaining said flexible scale members therein.

ARTHUR FREDERICK ECKEL.

REFERENCES CITED

The following references are of record in the file of this patent:

UNITED STATES PATENTS

| Number | Name | Date |
|---|---|---|
| 870,884 | Holinger | Nov. 12, 1907 |
| 1,186,093 | Harvey | June 6, 1916 |
| 1,959,990 | Summers | May 22, 1934 |
| 2,091,661 | Von Forster et al. | Aug. 31, 1937 |

FOREIGN PATENTS

| Number | Country | Date |
|---|---|---|
| 484,852 | Great Britain | May 11, 1938 |

OTHER REFERENCES

Keuffel & Esser Co.'s Catalogue of 1909; Fig. 1200 on page 167; published by Keuffel & Esser Co., 127 Fulton Street, New York, N. Y.